Oct. 19, 1971  A. E. EVENSON  3,613,249
DEVICE FOR LOCATING HEAVENLY BODIES
Filed Nov. 18, 1968  3 Sheets-Sheet 1
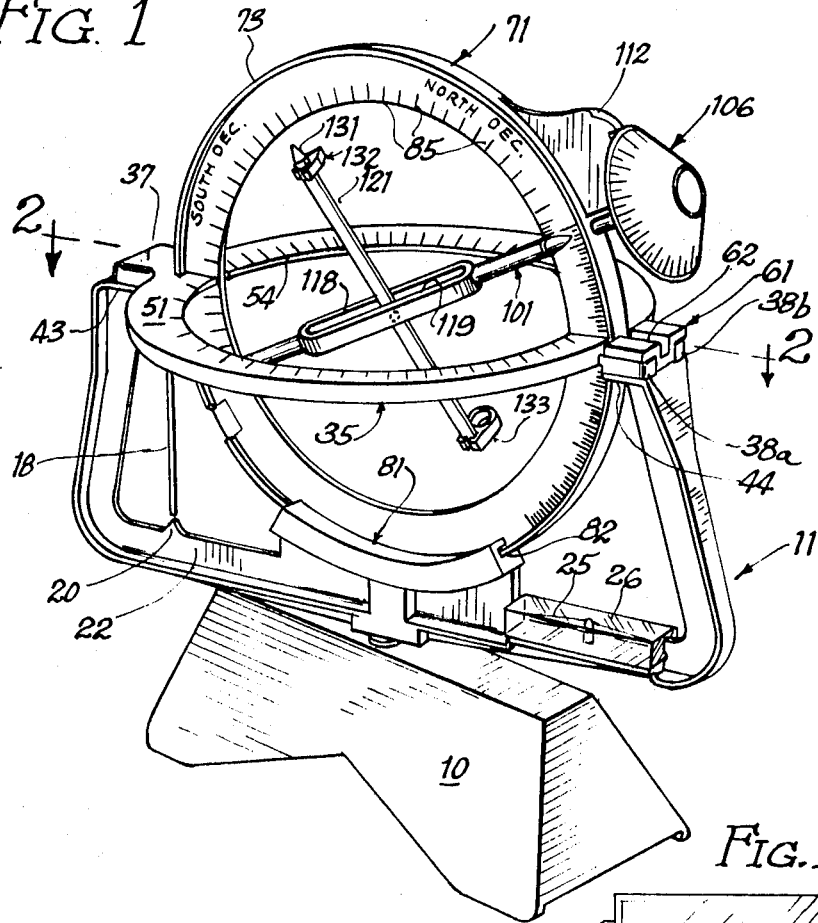
FIG. 1
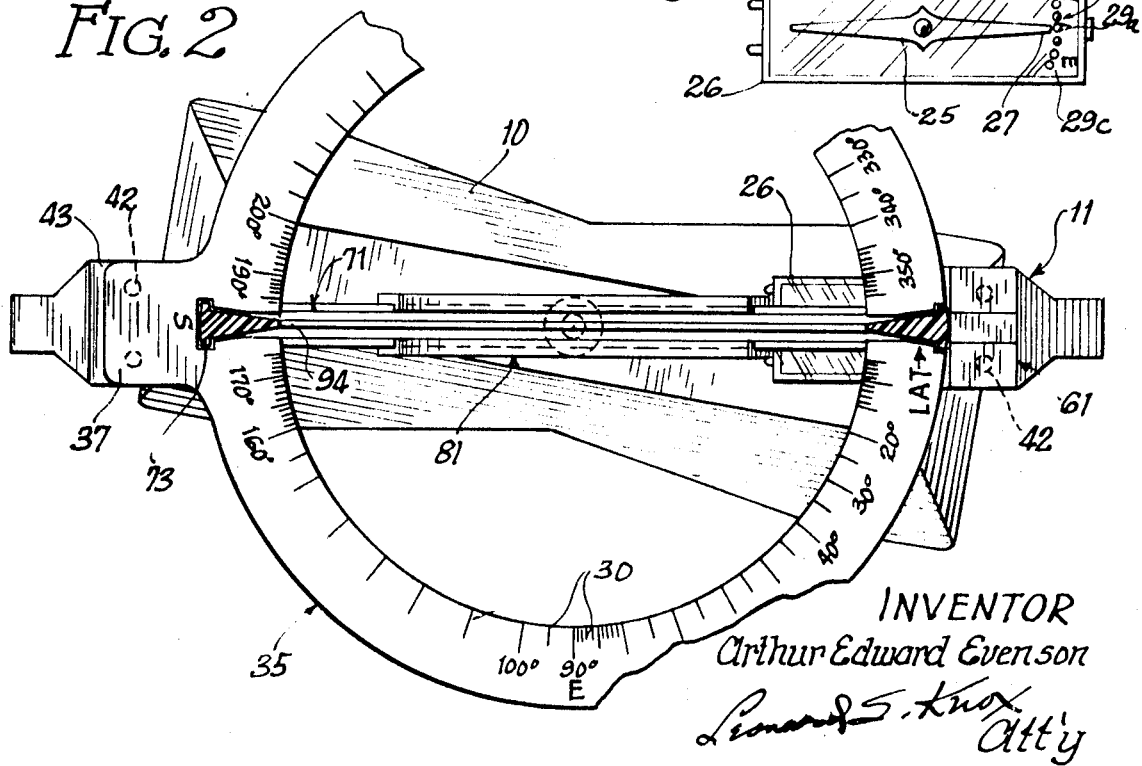
FIG. 2
FIG. 15
INVENTOR
Arthur Edward Evenson
Leonard S. Knox
Att'y Oct. 19, 1971          A. E. EVENSON          3,613,249
DEVICE FOR LOCATING HEAVENLY BODIES
Filed Nov. 18, 1968          3 Sheets-Sheet 2
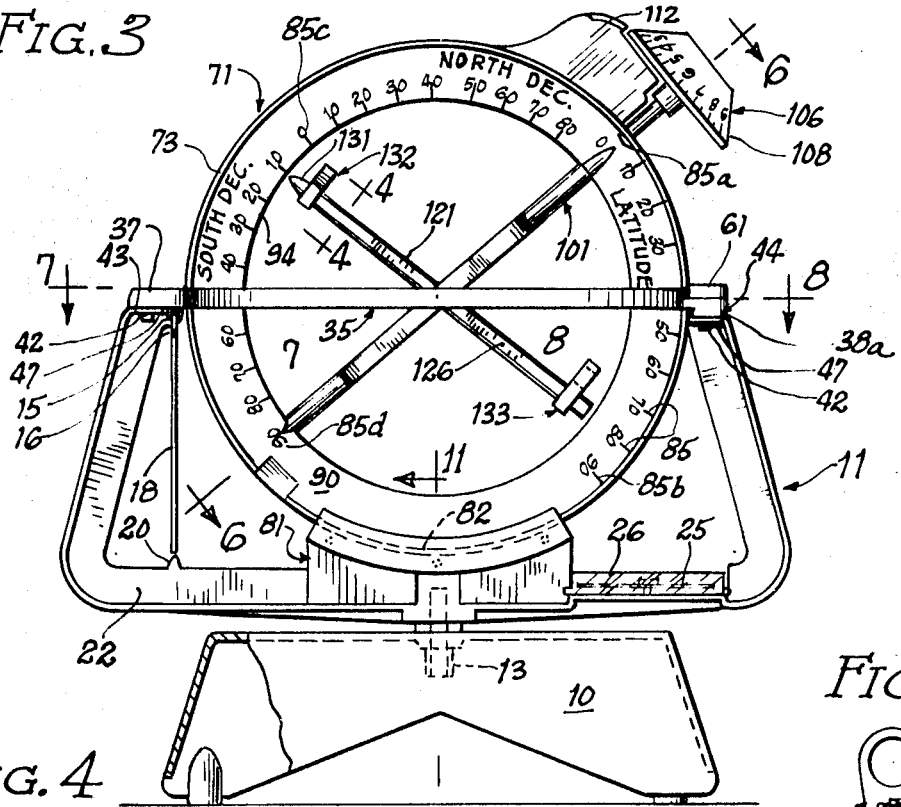
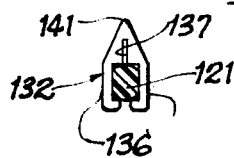
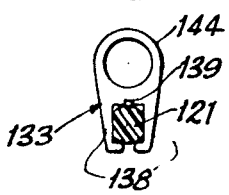
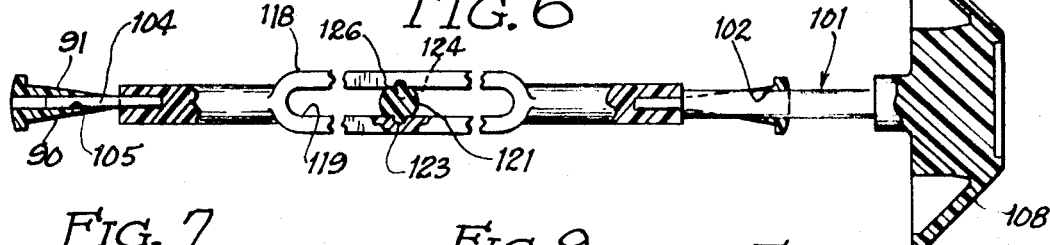
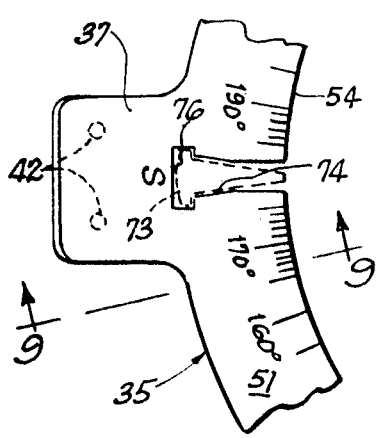
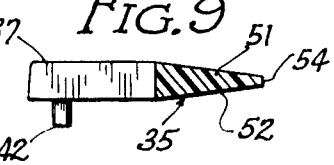
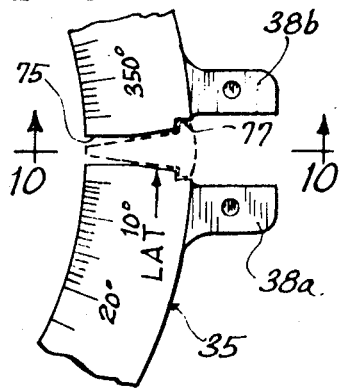

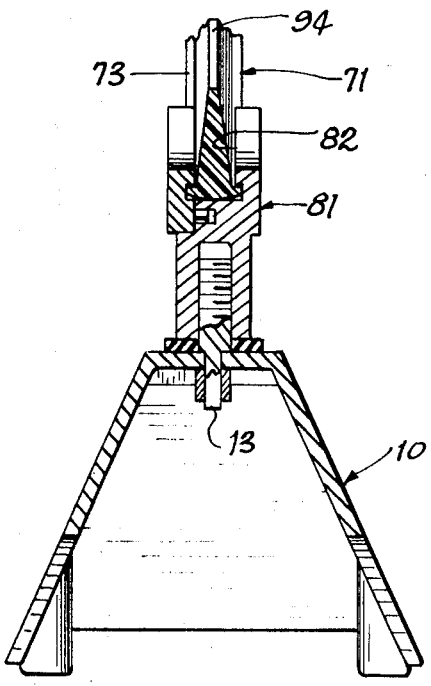
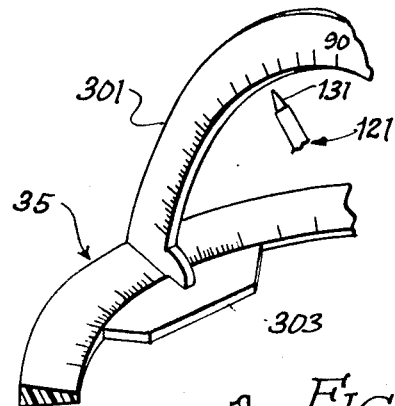
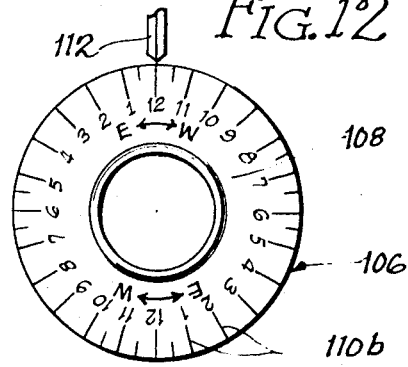
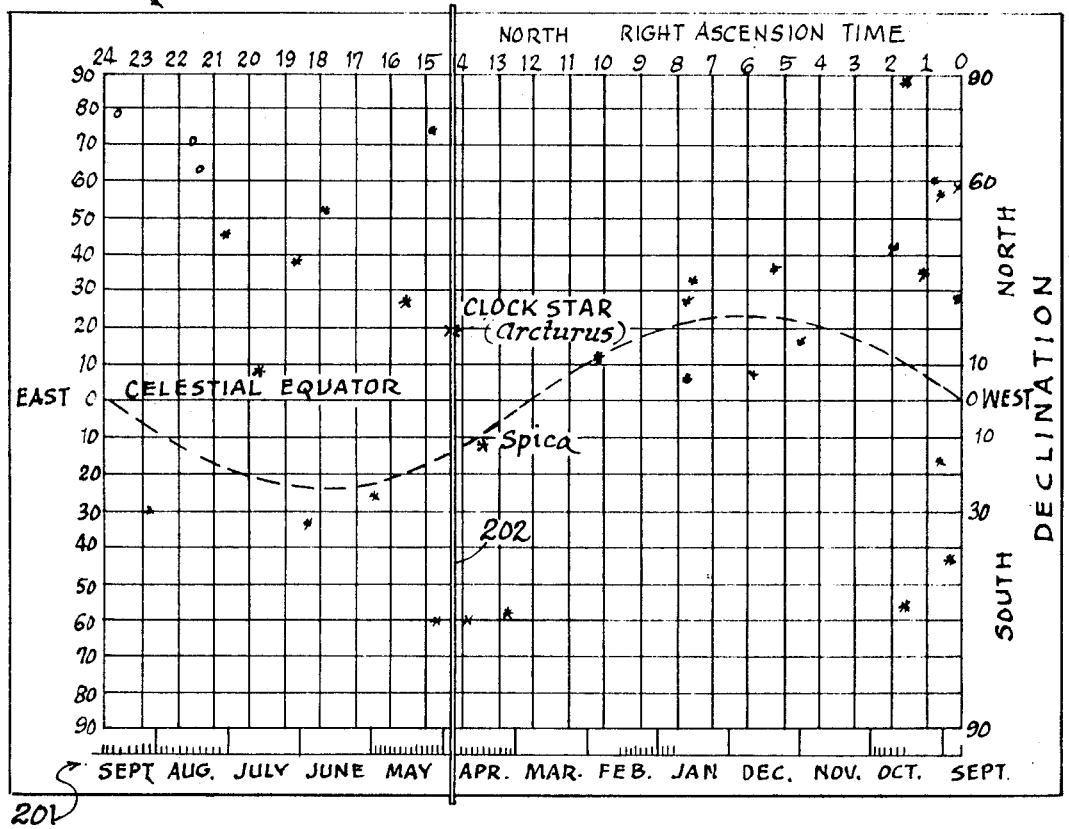

United States Patent Office

3,613,249
Patented Oct. 19, 1971

3,613,249
DEVICE FOR LOCATING HEAVENLY BODIES
Arthur Edward Evenson, 3606 Pheasant Drive,
Rolling Meadows, Ill. 60008
Filed Nov. 18, 1968, Ser. No. 777,214
Int. Cl. G01c 17/34
U.S. Cl. 33—61                                6 Claims

ABSTRACT OF THE DISCLOSURE

A device for locating a heavenly body by knowing its azimuth and declination with respect to the celestial sphere or, having a specific body, reversing the process and determining the azimuth and declination. The device includes sighting means mounted for movement in azimuth and declination, a horizon (azimuth) ring and declination ring, both marked in degrees, means for establishing a horizontal plane of reference and means to take into account the time of observation. The device is characterized by simplicity of construction in order to adapt the same for use by youthful or amateur astronomers.

---

This invention relates to astronomical instruments. More specifically it has reference to a device primarily intended for use by youthful or amateur astronomers in studying heavenly bodies, and which depends upon very basic considerations free of mathematical involvement.

Principal objects of the invention are to provide a device characterized as aforesaid which comprises a minimum number of parts which are desirably molded of plastic composition and which are so interrelated as to enable the user to manipulate the same in a reliable, foolproof manner, and to enable the device to be sold at a sufficiently low price as to appeal to the class of users to whom it is primarily directed. By utilizing a map of the celestial sphere combined with a date and time scale and by assuming a specific star as the "clock star" a versatile device is made available.

Another object is to provide a device as aforesaid which, in addition to the uses set forth above, will impart to the user a knowledge of the different kinds of time involved in astronomical observation in relation to terrestrial time.

A further object is to provide the user with simplified methods of understanding the significance of outer space, the heavenly bodies therewithin and the relation of the solar system and its members to the stellar universe.

Another object is to provide a device including means for performing a variety of astronomical experiments, for example, finding the time of rising and setting of the sun.

Still another object is to provide a device as aforesaid whereby the user may familiarize himself with the relationship between standard time, local mean time and local apparent time.

An additional object of the invention resides in a device so constructed as to enable the user, generally a juvenile, to relate himself to the celestial sphere and its coordinates of reference with respect to the terrestrial sphere.

Another object is to educate the user in identifying selected heavenly bodies, such as planets and stars by utilizing the device inversely.

A further object is to teach the user how to tell time from the stars or the moon.

Another object is to educate the user as to the manner in which the stars may be used to establish directions on the terrestrial sphere, for example, in connection with navigation, to check the accuracy of a compass and to correct compass readings for magnetic deviation and variation.

Other objects and advantages of the invention will become apparent from the ensuing description which, taken with the accompanying drawings, discloses a preferred form in which the principles of the invention may be embodied.

In these drawings:
FIG. 1 is a perspective view of a device incorporating the principles of the invention;
FIG. 2 is a cross section, with portions broken away, taken on the line 2—2 of FIG. 1;
FIG. 3 is a front elevational view;
FIG. 4 is a cross section taken on the line 4—4 of FIG. 3;
FIG. 5 is a cross section taken on the line 5—5 of FIG. 3;
FIG. 6 is a cross section taken on the line 6—6 of FIG. 3;
FIG. 7 is a cross section taken on the line 7—7 of FIG. 3;
FIG. 8 is a cross section taken on the line 8—8 of FIG. 3;
FIG. 9 is a cross section taken on the line 9—9 of FIG. 7;
FIG. 10 is a cross section taken on the line 10—10 of FIG. 8;
FIG. 11 is a cross section taken on the line 11—11 of FIG. 3;
FIG. 12 is a detail view to show the face of the hour circle knob;
FIG. 13 shows the star chart used in connection with operation of the device;
FIG. 14 is a perspective view of an adjunct for alternative use of the device; and
FIG. 15 is a top plan view of the compass needle and the markers co-operative therewith.

Broadly regarded, the device comprises a base upon which is mounted a yoke arranged for rotation through 360°. The yoke includes a compass for orienting the same in a northerly heading and a gravity-responsive device to position the yoke and base in a level position. A horizon ring disposed in a horizontal plane is secured to the yoke and a meridian ring is, in turn, mounted on the horizon ring and yoke for rotation in a vertical plane. Pivotally carried on an axis which is a diameter of the meridian ring is an hour circle shaft to one end of which is secured to a knob for rotating the shaft to an angle corresponding to the time at which an observation is being made. A sighting bar having an index at one end is pivotally mounted on the hour circle shaft, the bar having a pair of sights whereby the bar may be aligned with the object being observed. In effect the mode of mounting the sighting bar allows the same to be swung about two axes, one of which accommodates for the time factor and the other for setting to a meridian. In another aspect the device includes an attachment for reading altitude and azimuth in connection with certain uses of the device.

CONSTRUCTION

Adverting to the drawings there is shown, by way of example, a device incorporating the principles of the invention. A base 10 of any suitable form and of such mass as to maintain a stable condition of the remaining components supports a rotatable yoke 11 by means of a pivot pin 13 whereby the yoke and the parts carried thereby may be rotated 360° in azimuth. Alternatively the pivot pin 13 may be constructed in the form of a swivel including a threaded stem to fit on a conventional, height-adjustable camera tripod. Such alternative has utility in the those cases where a suitable rigid platform is not readily available outdoors. Further, the telescoping legs of the tripod will enable the user to locate the apparatus at a convenient height for viewing.

Suitable means are provided to insure that the device is set plumb and level. For example, the yoke 11 may have a hole 15 through which an eye 16 at one end of a freely suspended rod 18 may be carried, the degree of freedom whereof is sufficient to allow swinging of the rod to align its distal end with an index 20.

The bight 22 of the yoke 11 carries a magnetized compass needle 25 contained in a transparent casing 26 (FIG. 15) to protect the same against damage. The end 27 of the needle cooperates with a series of markers embossed on the cover of the casing, and indicated generally at 29 for use in calibrating the position of the device with respect to a northerly heading subject to correction for magnetic variation. In the example there is a central marker 29a, three other markers 29b on one side thereof and three markers 29c on the other side. These markers are located at 5° intervals, the group 29b, being indicated as westerly variation W and the group 29c, being indicated as easterly variation E.

Secured to the yoke 11 at opposite ends of a diameter is the horizon ring 35 having ears 37, 38a and 38b having pins 42 passed through holes in pads 43, 44 to locate the ring. Resilient nuts 47 or the equivalent are seized on the pins 42 to obtain a rigid assembly.

The horizon ring 35 is provided with graduations 30 at every degree of circumference beginning at the north (right hand side of FIG. 2) and continuing clockwise to the place of beginning. The 0°, 90°, 180° and 270° graduations correspond to the compass points: North, East, South and West respectively and are indicated by embossed letters "E," "S" and "W" except for north, where interference with the meridian ring renders this impractical. However the user will understand from those points which are identified which point of the horizon ring is "north."

From FIG. 9 it will be seen that the upper and lower faces 51, 52 of the horizon ring are mutually inclined inwardly to define a narrow, inner periphery 54 to facilitate setting of the sighting bar to a selected graduation.

The right hand ears 38a and 38b are surmounted by a saddle 61 which includes a central recess 62 whereby the "hour setting" shaft (referred to for conciseness as the "hour circle shaft") may be rotated to a position at which the axis of the same may be brought to horizontal without interference. The saddle is engaged with the ears 38a and 38b by pins (not shown) entering corresponding apertures in the ears.

The meridian ring 71 lies in a vertical plane and includes a peripheral flange 73. The horizon ring is cut out to define slots 74, 75 to receive the meridan ring. Retention and guiding of the meridian ring during its rotation is obtained by a slot 76 at the outer end of the slot 74, by a recess 77 at the outer end of slot 75 and by means of a shoe 81 formed as part of the yoke 11. The shoe has an arcuate T-slot receiving the rim of the meridian ring with a sliding fit.

The meridian ring carries graduations 85, beginning at 0°, as indicated at 85a, aligned with the axis of the hour circle and running clockwise to 90° at 85b; a second portion of this scale begins at 85c (0°) and continues for 90° clockwise, to terminate at 85a. Beginning at 85c the scale continues counter-clockwise for 90°, ending at 85d. These several portions of the scale are identified as follows:

From 85a to 85b, "latitude"
From 85a to 85c, "north declination"
From 85c to 85d, "south declination"

As will appear subsequently the fourth quadrant from 85b to 85d is blank, as serving no useful purpose.

The front and rear faces 90, 91 of the meridian ring 71 are mutually inclined inwardly (FIG. 6) to provide a narrow edge 94 to facilitate reading of the graduations.

Arranged to rotate on an axis passing essentially through graduations 85a and 85d is an hour circle shaft 101. The slight displacement of the right hand end of the shaft axis is necessitated by the presence of the graduation 85a (0°) which would otherwise be obscured. However no material error is introduced by such displacement amounting, in the example, to about 1° or 2°.

At its right end the shaft 101 is supported in a bore 102 through the meridian ring (FIG. 6) and at its left end by means of a pin 104 received in a bore 105 in the ring. The fit is reasonably tight so that an established setting of the shaft is proof against inadvertent dislodgment.

An hour circle knob is secured to the right end of the shaft 101 and its beveled outer face 108 is graduated (FIG. 12) to indicate times east and west of the meridian whereat the observer is located. These graduations 110b consist of two 12-hour periods, one running clockwise from 12 o'clock to 12 o'clock beginning at an index 112 mounted on the outer periphery of the meridian ring, and similarly on the other half. Rotation for easterly adjustment is counter-clockwise for "East" and clockwise for "West," as indicated by the abbreviations "E" and "W" embossed on the dial.

The shaft 101 includes a central yoke portion 118 defining an elongated, through opening 119 to allow for tilting of the sighting bar 121 with respect to the axis of the shaft. The portion 118 is so constructed as to be resilient so that the same may be momentarily widened to allow initial assembly of the sighting bar for swivelling relation therewith. The axles may take the form shown, comprising opposite pintles 123 snapped into depressions 124. Preferably the sighting bar is flattened on its sides, as at 126, at least in the areas where frictional relation between the parts 118 and 121 obtains, in order to increase the surface contact. Moreover the slot 119 is molded with its longer faces closer together than the face-to-face dimension of the sighting bar in order that the resiliency of the portion 118 may be exerted elastically to retain the sighting bar in the position to which it is moved for a specific observation.

The upper end 131 of the sighting bar is pointed to act as an index correlative with a selected graduation on the meridian or horizon rings. Adjacent this end is a front sight 132 (FIG. 4). For ease of assembly the sight is of plastic composition having wings 136, 136 including inwardly-directed lugs and a slot 137. The wings are initially molded with the space defined therebetween narrower than the face-to-face dimension of the bar 121 so that assembled relation may be maintained frictionally. However, it is within contemplation to constitute the joint by other means. The rear sight 133 is constructed similarly to the front sight, including wings 138, 138 having inwardly-turned lugs and a slot 139 (FIG. 5). The explanation is the same as for the front sight. Thus the sights may be removed and re-located for convenience in making specific observations. To assure proper orientation of the sights, the opening defined by either the lugs 136 or 138, is shown as square, and the engaged portion 121 of the bar, is congruent therewith. Other forms of non-rotatable connection may be employed, these being referred to, for convenience, as "splined" connections.

The front sight is provided with a peaked working portion 141 and the rear sight has a ring-shaped portion 144 with which the portion 141 is aligned visually during an observation.

The device is employed in conjunction with a novel form of chart 200 (FIG. 13) combining a star chart as shown and a time scale 201 for use in a manner to be described. Basically the chart 200 eliminates the step of calculating sidereal time as a factor in locating a desired star or other heavenly body. For clarity, relatively few stars are shown on this chart.

OPERATION, BROAD CONSIDERATIONS

In theory the observer is regarded as positioned at the center of the meridian ring, i.e. the point at which the sighting bar is pivoted, so that observations of heavenly bodies may be carried out on the basis of the declination and azimuth position of the body on the celestial sphere, taken in conjunction with the time and date of observation. The horizon ring corresponds to the horizon in the ordinary sense. The meridian ring is used to locate the local meridian, namely the imaginary line which begins at the earth's north pole, passes through the place of observation and continues to the south pole. By rotation of the meridian ring the same can be set for the latitude at which the observer is located. The index for this "degree" setting of the meridian ring is the upper surface 51 of the horizon ring, at the place where the inscription "LAT" appears (FIG. 8). A conventional map will inform the user of his latitude.

The sighting bar is set for the declination of the star or other body by placing the tip 131 thereof opposite the appropriate graduation on the declination scales 85a, etc. This having been done, the hour shaft 101 is rotated by means of its knob to take the time of day into account. Following these settings the body being located is seen by looking through the ring 144 in a manner such that the tip of the point 141 is visible at approximately the center of the ring. Further details will appear subsequently.

Unless the observation is made precisely at the zone meridian, the meridians located every 15° of longitude starting at Greenwich, England, conversion must be made from standard time to local mean time. At a zone meridian standard time and local mean time will be the same. Such conversion is accomplished by determining how far, in degrees, the observer is located east or west of zone meridian. These lines of longitude (meridian lines), being spaced 15° apart, can be regarded in a time sense as being 1 hour (60 minutes) apart, i.e., 1° equals 4 minutes. Accordingly, if the observer is east of the zone meridian, then the correction must be added to standard time; if west, then the correction must be subtracted. Hence, the time correction factor (in minutes) is obtained by multiplying the departure in degrees by 4. Obviously, knowledge of the local mean time will yield standard time by a reversal of the foregoing procedure. Recapitulating, if the observer is east of the zone meridian the correction is added to standard time to obtain local mean time, and is subtracted from local mean time to obtain standard time. If the observer is west of the zone meridian the correction is subtracted from standard time to obtain local mean time, and is added to local mean time to obtain standard time.

In operating the invention device the declination in degrees of the body will be taken into account, but "right ascension," being measured in hours, will be taken into account by use of the hour circle knob 106.

SETTING UP THE DEVICE

The base 10 is placed on any stable surface or, after detaching the base, the device may be mounted on a camera tripod, as described above. As alluded to above the front and rear sights, being held only by friction may be slipped off and re-located in any of the three remaining positions, being certain that the tip 141 and ring 144 are on the same side of the sighting bar 121.

The meridian ring is positioned to the observer's latitude as explained above.

The device must be set plumb and level. This adjustment is made by means of the rod 18 and index 20. When the base 10 is used the feet thereof can be raised or lowered by appropriate shims. When a tripod is used the telescoping legs thereof can be moved inwardly or outwardly.

While leveling is proceeding the apparatus must be oriented to locate the plane of the meridian ring in a north-south direction. To this end the compass needle 25 is relied on. Correction for magnetic variation is made in the manner now to be described.

The necessary correction for a particular location will be obtained from a map showing magnetic variation, for example, a map giving lines of variation at each 5°. The markers 29b and 29c are spaced 5° apart on each side of index 20a (FIG. 15). For example, if the variation for the place of observation is 10° east, the device will be located so that the point of the needle is two spaces from the index 29a toward "E."

In order to locate a selected star the chart of FIG. 13 is employed. This chart is desirably mounted on a rigid backing over which a laterally movable index 202, e.g. a rubber band, may be stretched. The index is positioned in line with the date of observation (scale 201) and is referred to herein as the "clock star line." For convenience only a few of the stars generally visible to the naked eye on a clear night are shown. Although "right ascension time" is not, as mentioned, used directly with the present device, the scale is included for ready computation of the time relation between stars.

The scale 201 shows the days of the year and, for convenience, is identified as a clock star locator. It is used in conjunction with the index 202 to locate a selected star, which is readily identifiable by reason of magnitude and position, for the date of observation.

A star's position is identified by its declination, i.e. the number of degrees it is north or south of the celestial equator, and by how many hours it is east or west of the clock star line. Obviously, such requirement depends upon the date of observation which is indicated by moving the index 202 into alignment with such date. As an example, the drawing shows the clock star line for April 26.

Now any star on this line may be designated as a "clock star" e.g. Arcturus, since this star is of first magnitude and therefore easily seen. The main purpose of the "clock star" is to teach the young observer how to find stars—not only the clock star but all stars. After a little practice, the observer will find that he can omit finding the clock star and proceed directly to locating some other star. Any other star on the index 202 may be designated as a clock star for the day in question.

Now assume that the specific star to be located is Spica. From the chart, Spica is 11° south and about one "hour" west of the clock star line. Assuming an observer's latitude of 40° and the meridian ring has been thus set (FIG. 3), the star arm is moved to present the tip 131 at 11° south declination and the hour circle is set to agree with local time. However Spica is about one hour west of the clock star line, hence the hour circle is turned one hour toward the west. The sights 132 and 133 are now pointing at Spica.

At this juncture it is to be noted that, when the sighting bar 121 lies in the plane of the meridian ring 71 the index 112 is aligned with the graduation marked 12. Since, in the exemplificative case, the hour circle is to be turned to local time, e.g. 8 p.m., such time is arrived at by the shortest route, namely, by rotating the hour circle counterclockwise, until the index 112 is aligned with the numeral "8." Now, since Spica is one hour west of the clock star line, the hour circle is rotated one hour toward the west, i.e. clockwise, which is equivalent to the position "9."

TO LOCATE A PLANET

For this activity a planet location chart showing declination and right ascension for the planet in question and the current year is required. By using a chart in which the path is subdivided into monthly periods the position for the day upon which the observation is to be made can be plotted on the star chart (FIG. 13) and this position used as in the case of a star. The same procedure is applicable.

TO IDENTIFY AN UNKNOWN STAR

This activity constitutes a simple reversal of the steps followed in locating a selected star, as described above.

Specifically, having selected a star to be identified, the sighting bar is positioned to locate the star in the sights.

The hour circle is rotated to position the tip 131 in the plane of the meridian ring and the declination is noted. The hour circle is then rotated to local time, noting whether rotation has been to the east or west. Then the number of hours corresponding to this rotation is computed and referred back to the clock star line 202. Thus, knowing such horizontal and vertical co-ordinates the star can be identified on the chart by name.

TO DETERMINE TIME OF SUNRISE AND SUNSET

For these procedures the solar declination for the day in question is obtained from a table, e.g. the Nautical Almanac. Assuming 40° latitude, as in the previous examples, and the day as March 21, the first day of spring, the declination is 0°. The sighting bar is positioned in the plane of the meridian ring at 0°. Now the hour circle is rotated to carry the sighting bar into the plane of the horizon ring 35 with the tip 131 on the eastern half thereof. The hour circle will then indicate the time of sunrise, in the example, 6:00 a.m., local apparent time, which may be readily converted to standard time. The sun's path during the day may be studied. Since the sun's apparent motion is westward, the hour circle is turned westerly until the sighting bar is in the plane of the meridian ring, namely, noon, with the sun at its highest point. Its height above the horizon (altitude) at noon can be determined by counting the number of degrees on the meridian ring between the tip 131 and the southern horizon. Time of sunset may be determined by continuing to rotate the hour circle westward until the tip 131 is even with the western horizon. The hour circle now indicates 6:00 p.m., local apparent time.

TO MEASURE TIME BY THE SUN

The device is set level, pointed to true north and the meridian ring 71 adjusted for the observer's latitude in the manner described above.

A small paper or cardboard disc will have a hole punched at its center and, after removing the front sight 132, the disc is pushed over the sighting bar. The disc is located about half way along that leg of the sighting bar. The solar declination for the day of observation is found and the tip 131 set accordingly.

The hour circle is turned gradually to point the tip 131 toward the sun. When the shadow of the sighting bar on the disc disappears the bar is pointing directly at the sun. The hour circle will then give the local apparent time.

The invention apparatus is capable of a great many uses other than those described, but since these are believed to be apparent from these descriptions, this specification will not be unnecessarily encumbered. Among such other uses are: telling time by the stars, finding the rising and setting times of the stars, finding directions, checking a magnetic compass and finding a particular latitude or longitude.

The bearing and the altitude of a heavenly body may be determined by the use of the attachment of FIG. 14. The curved scale 301 is fixed at right angles to a base part 303 which has one side shaped to conform to the inner circumference 54 of the horizon ring while the sighting bar is positioned to point at the heavenly body. The attachment, comprising the parts 301 and 303, is located with the plane of the scale 301 in alignment with the tip 131. Since this scale is graduated from 0° (at the mid-plane of the horizon ring) to 90° near its end, the altitude may be read directly. The bearing will be read from the horizon scale where it is intersected by the plane of the scale 301.

I claim:

1. A device for the purposes described, comprising a base, a yoke having a bight and an upstanding leg at each end of the bight, means supporting said yoke on said base for rotation on a vertical axis, means on said yoke for locating the device in a level position, means on said yoke for orienting the principal plane of the yoke in a north-south plane referred to the terrestrial globe, a horizon ring positioned on a horizontal plane and secured at each end of a diameter to respective legs of the yoke, said horizon ring having graduations thereon to indicate angular positions in azimuth, a meridian ring positioned with its prncpal plane vertical and coincident with the prncipal plane of the yoke, said meridian ring being supported on said yoke for rotation in said principal plane, said meridian ring having a zero graduation thereon, a first set of graduations thereon beginning at said zero and extending about said ring to indicate north declination, a second set of graduations thereon beginning at said zero and extending about said ring in the opposite direction from said first set to indicate south declination, and a third set of graduations thereon having a zero coinciding with the 90° graduation of said first set and extending 90° about said ring, to indicate the observer's latitude, an index in the plane of the horizon ring fixed relative to the yoke and cooperable with said third set of graduations whereby the meridian ring may be angularly adjusted to compensate for the observer's latitude, an hour-circle shaft rotatably mounted on said meridian ring with its axis on a diameter thereof corresponding to 0° latitude, a sighting bar pivotally mounted intermediate its ends on said shaft for movement through a range of substantially 180°, said bar having a front sight and a rear sight at respective ends thereof, said bar having an index at one end cooperable with the graduations of the horizon ring or the graduations of the meridian ring, a knob fixed to said shaft to rotate the same, said knob having graduations cooperable with a fixed index on the meridian ring to introduce the factor of right ascension into an observation.

2. The combination in accordance with claim 1 wherein the yoke-orienting means comprises a magnetized compass needle, pivot means for supporting the needle and a set of graduations cooperable with a point of the needle, said set including a central graduation indicating true north when the magnetic variation at the place of observation is 0° and a plurality of graduations at each side of the central graduation equi-angularly spaced about the axis of said needle pivot by some fixed increment indicating magnetic variation, whereby the yoke may be rotated with respect to the base to adjust for magnetic variation existing at the place of observation.

3. The combination in accordance with claim 1 in which the front and rear sights are detachably engaged frictionally with the sighting bar by means of a splined connection enabling placement of the sights, as a working pair, in a plurality of angular positions about the principal axis of the bar.

4. The combination in accordance with claim 1 in which the pivotal mounting of the sighting bar is provided by a slot at the center of said shaft through which the sighting bar is received, pintle means between the bar and sides of the slot to constitute the pivot and frictional means between the shaft and bar to maintain the bar in any selected position within its range of movement.

5. The combination in accordance with claim 4 wherein said slot is defined by resilient walls adapted to exert pressure on opposite sides of the sighting bar to constitute said frictional means.

6. A device for the purposes described comprising a base, a horizon ring having its principal plane positioned horizontally, means supporting said horizon ring on said base for rotation on a vertical axis, said horizon ring having graduations thereon to indicate angular positions in azimuth, a meridian ring positioned with its principal plane at right angles to the principal plane of the horizon ring, said meridian ring being supported on said base for rotation about a horizontal axis, said meridian ring having a zero graduation thereon, a first set of graduations thereon, beginning at said zero and extending about said ring to indicate north declination, a second set of graduations thereon beginning at said zero and extending about mid ring in the opposite direction from said first set to indicate south declination and a third set of graduations thereon having a zero coinciding with the 90° graduation of said first set and extending 90° about said ring to indicate the observer's latitude, an index in the plane of the horizon ring fixed relative to the base and cooperable with said third set of graduations, whereby the meridian ring may be angularly adjusted to compensate for the observer's latitude, an hour-circle shaft rotatably mounted on said meridian ring with its axis on a diameter thereof corresponding to 0° latitude, a sighting bar pivotally mounted intermediate its ends on said shaft for movement through a range of substantially 180°, said bar having a front sight and a rear sight at respective ends thereof, said bar having an index at one end cooperable with the graduations of the horizon ring or the graduations of the meridian ring, a knob at one end of said shaft to rotate the same, said knob having graduations cooperable with a fixed index on the meridian ring to introduce the factor of right ascension into an observation.

References Cited
UNITED STATES PATENTS

| | | | |
|---|---|---|---|
| 16,002 | 11/1856 | Burt | 33—61 UX |
| 275,913 | 4/1883 | Holmes | 33—61 |
| 538,889 | 5/1895 | Arvidson | 33—61 |
| 583,518 | 6/1897 | Stoller | 33—61 |
| 1,852,656 | 4/1932 | Johnson | 35—5 |
| 2,054,090 | 9/1936 | Marple | 33—51 UX |
| 2,372,487 | 3/1945 | Hagner | 35—43 |
| 2,696,053 | 12/1954 | Royt | 33—61 |

ROBERT B. HULL, Primary Examiner

U.S. Cl. X.R.

35—43